United States Patent
Balestra et al.

(10) Patent No.: US 8,785,572 B2
(45) Date of Patent: Jul. 22, 2014

(54) PROCESS FOR THE GAS-PHASE POLYMERIZATION OF OLEFINS

(75) Inventors: Enrico Balestra, Ferrara (IT); Tiziana Caputo, Ferrara (IT); Antonio Mazzucco, Ferrara (IT); Riccardo Rinaldi, Mantova (IT); Silvia Soffritti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 13/703,613

(22) PCT Filed: Jun. 9, 2011

(86) PCT No.: PCT/EP2011/059625
§ 371 (c)(1),
(2), (4) Date: Dec. 11, 2012

(87) PCT Pub. No.: WO2011/160961
PCT Pub. Date: Dec. 29, 2011

(65) Prior Publication Data
US 2013/0090436 A1 Apr. 11, 2013

Related U.S. Application Data

(60) Provisional application No. 61/398,367, filed on Jun. 24, 2010.

(30) Foreign Application Priority Data

Jun. 22, 2010 (EP) .................................. 10166870

(51) Int. Cl.
*C08F 2/00* (2006.01)
*C08F 210/00* (2006.01)
*C08F 110/02* (2006.01)
*B01J 19/00* (2006.01)
*B01J 8/18* (2006.01)

(52) U.S. Cl.
USPC ............... 526/64; 526/65; 526/348; 526/352; 422/131; 422/139

(58) Field of Classification Search
USPC ............... 526/64, 65, 348, 352; 422/131, 139
See application file for complete search history.

(56) References Cited

U.S. PATENT DOCUMENTS

2009/0036617 A1\* 2/2009 Mei et al. ........................ 526/65

FOREIGN PATENT DOCUMENTS

| EP | 1012195 | 2/1993 |
|---|---|---|
| EP | 0728769 | 8/1996 |

(Continued)

OTHER PUBLICATIONS

Geldart, D. , "Gas Fluidisation Technology", J. Dily & sons Ltd 1986 , 155.

*Primary Examiner* — William Cheung

(57) ABSTRACT

A process for the gas-phase copolymerization of: (a) propylene, (b) at least one $C_4$-$C_8$ α-olefin, and (c) optionally ethylene, the process being carried out in a reactor having two interconnected polymerization zones, wherein the growing polymer particles flow through the first of said polymerization zones (riser) under fast fluidization conditions, leave said riser and enter the second of said polymerization zones (downcomer) through which they flow downward in a densified form, leave said downcomer and are reintroduced into said riser, thus establishing a circulation of polymer between the riser and the downcomer, the gas mixture present in the riser being at least partially prevented from entering the downcomer by introducing into the upper part of said downcomer a liquid barrier having a composition different from the gaseous mixture present in the riser and comprising at least one $C_4$-$C_8$ α-olefin in a total amount of from 0.1% to 35% by mol.

10 Claims, 1 Drawing Sheet

(56) References Cited

FOREIGN PATENT DOCUMENTS

| | | |
|---|---|---|
| EP | 782587 | 7/1997 |
| WO | WO-2005019280 | 3/2005 |
| WO | WO-2005059210 | 6/2005 |
| WO | WO-2006/002778 | 1/2006 |
| WO | WO-2006120187 | 11/2006 |

* cited by examiner

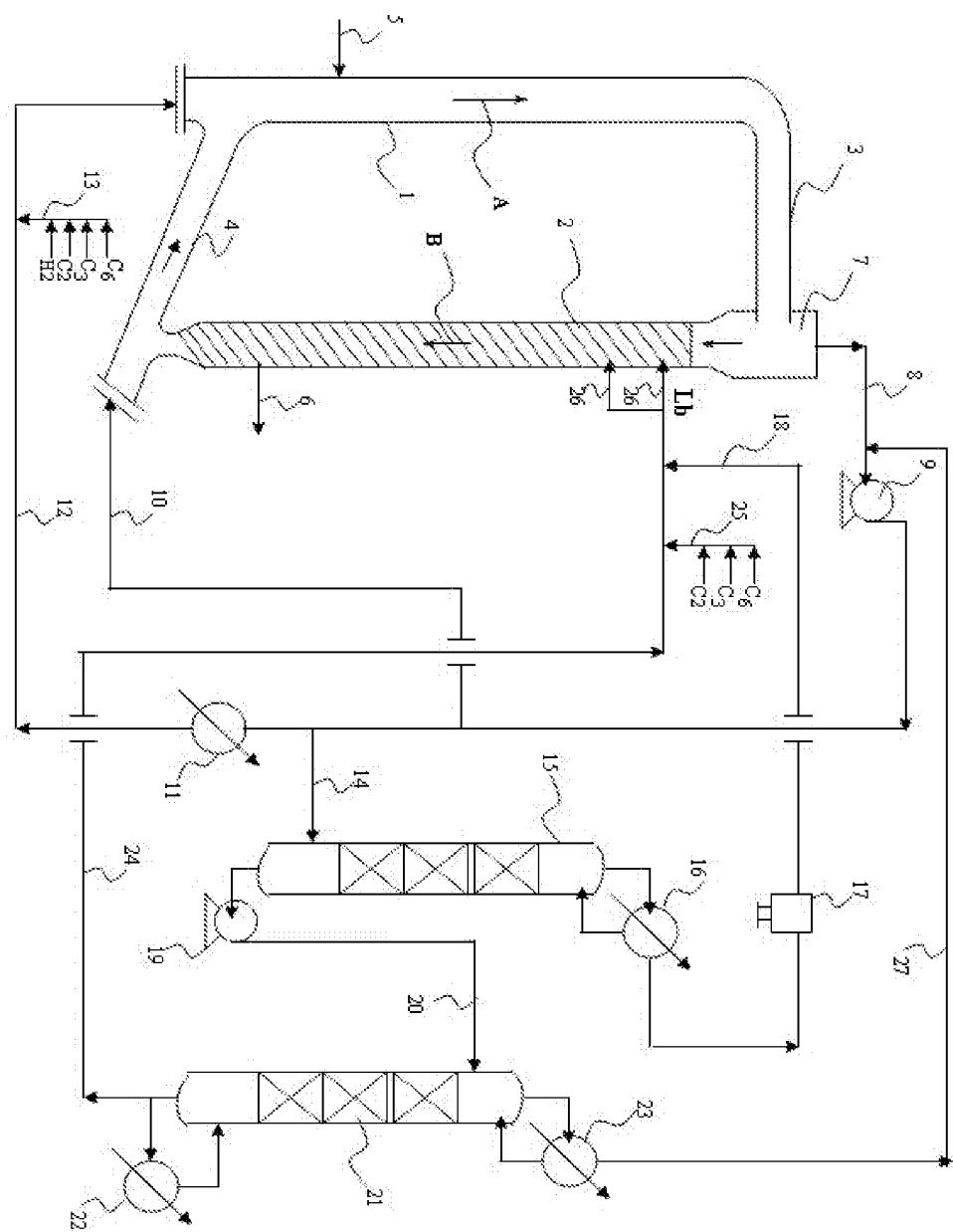

PROCESS FOR THE GAS-PHASE POLYMERIZATION OF OLEFINS

This application is the U.S. national phase of International Application PCT/EP2011/059625, filed Jun. 9, 2011, claiming priority to European Patent Application 10166870.5 filed Jun. 22, 2010, and the benefit under 35 U.S.C. 119(e) of U.S. Provisional Application No. 61/398,367, filed Jun. 24, 2010; the disclosures of International Application PCT/EP2011/059625, European Patent Application 10166870.5 and U.S. Provisional Application No. 61/398,367, each as filed, are incorporated herein by reference.

The present invention relates to a gas-phase polymerization process for the olefin polymerization carried out in a polymerization reactor provided with two interconnected polymerization zones. In particular, the present invention relates to specific operating conditions to be satisfied when propylene is copolymerized with at least one $C_4$-$C_8$ α-olefin by means of said specific polymerization reactor.

The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst.

A widely used technology for gas-phase polymerization processes is the fluidized bed technology. In fluidized bed gas-phase processes, the polymer is confined in a vertical cylindrical zone (polymer bed). The reaction gases exiting the reactor are taken up by a compressor, cooled and sent back, together with make-up monomers and appropriate quantities of hydrogen, to the bottom of the polymer bed through a distribution plate. Entrainment of solid from the gas exiting the reactor is limited by an appropriate dimensioning of the upper part of the reactor (freeboard, i.e. the space between the upper bed surface and the gas exit point), where the gas velocity is reduced, and, in some designs, by the interposition of cyclones in the gases exit line. The flow rate of the circulating gaseous monomers is set so as to assure a velocity within an adequate range above the minimum fluidization velocity and below the "transport velocity". The heat of reaction is removed exclusively by cooling the circulating gas. The composition of the gas-phase controls the composition of the polymer, while the reaction kinetics is controlled by the addition of inert gases.

Since fluidized bed reactors approximate very closely the ideal behavior of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As a consequence, one of the major limits of fluidized bed processes is the difficulty of broadening the molecular weight distribution of the obtained polymers. The breadth of the molecular weight distribution has an influence both on the rheological behavior of the polymer (and hence the handling/processability of the polymer melt) and on the final mechanical properties of the product, and is a property particularly important for the (co) polymers of ethylene.

This problem has been addressed in EP-B-782587. According to this patent, it is possible to broaden the molecular weight distribution of polymers without affecting their homogeneity by means of a gas-phase process performed in a loop reactor responding to particular criteria of design. The gas-phase polymerization according to EP-B-782587 is carried out in two interconnected polymerization zones to which one or more monomers are fed in the presence of a catalyst under reaction conditions and from which the produced polymer is discharged. The process is characterized in that the growing polymer particles flow through the first of said polymerization zones under fast fluidization conditions, leave said first polymerization zone and enter the second polymerization zone, through which they flow in a densified form under the action of gravity, leave the second polymerisation zone and are reintroduced into the first polymerisation zone, thus establishing a circulation of polymer between the two polymerisation zones.

According to the description of EP-B-782587, it is possible to broaden the molecular weight distribution of the polymers simply by properly balancing the gas-phase compositions and the residence times in the two polymerisation zones of the gas-phase loop reactor. This is due to the fact that, while the polymer moves forward in the second polymerisation zone flowing downward in a plug-flow mode, owing to the monomer consumption, it finds gas-phase compositions richer in molecular weight regulator. Consequently, the molecular weights of the forming polymer decrease along the axis of this polymerization zone.

Different from the fluidized bed reactor technology, wherein the polymer particles grow in a fluidization state and their mutual distance is such to prevent their agglomeration, the new gas-phase technology described in EP-B-782587 has to cope with the occurrence of clogging of the gas-phase reactor. In fact, a relevant technical feature of this technology is given by the downward flow of polymer in a densified form along the second polymerization zone: high values of density of the solid are reached (density of the solid=kg of polymer per $m^3$ of reactor) in this portion of reactor. Due to this high concentration of polymer, a relatively limited amount of gas is available as a cooling medium inside the second polymerization zone. The polymerization reaction is exothermic and the heat of polymerization has to be removed by said limited amount of gas surrounding the polymer particles; moreover, the flow of gas moves slowly downward along said second polymerization zone and this limits considerably the heat exchange coefficient. As a consequence, the temperature of the polymer increases while it descends in the second polymerization zone, so that in the bottom part thereof the situation is particularly critical. Moreover, the motion of the polymer particles close to the reactor wall is made slower by the friction exerted by the wall. Hot spots can cause the polymer softening and the tackiness between adjacent polymer particles can lead to the formation of polymer lumps: the growth of said polymer lumps can partially clog this second polymerization zone with detrimental effects on the whole polymerization process.

According to the description of EP-B-1012195, it is possible to obtain, within the polymerization apparatus, two polymerization zones at different compositions by feeding a gas/liquid mixture to the top of the second polymerization zone. Said gas/liquid mixture acts as a barrier to the gas coming from the first polymerization zone. Moreover, the evaporation of the liquid component of said gas/liquid mixture contributes to generate a gaseous flow upward at the upper limit of the second polymerization zone. The established flow of gas upward has the effect of preventing the gas mixture present in the first polymerization zone from entering the second polymerization zone. The process disclosed in EP-B-1012195 reveals particularly useful to produce bimodal homopolymers or copolymers.

It would be desirable to find the best operative conditions to operate the above polymerization reactor of EP-B-1012195 when propylene is copolymerized with heavier comonomers, for instance $C_4$-$C_8$ α-olefins, such as 1-hexene or 1-butene.

It is known that semi-crystalline random propylene polymers containing recurring units derived from 1-hexene are suitable to be extruded as pipes showing good mechanical properties, in particular creep resistance and rigidity. Patent application WO2006/002778 discloses mono or multilayer pipe systems having at least one layer comprising a semi-crystalline copolymer of propylene and 1-hexene and optionally ethylene, wherein said copolymer contains from 0.2 to 5 wt % of recurring units derived from 1-hexene. These copolymers may be produced by means of the polymerization apparatus comprising two interconnected polymerization zones, described in the above mentioned EP-B-1012195. The obtained propylene/1-hexene copolymers show a broad distribution of the molecular weights, where the high molecular weight component is produced in the downcomer, while the low molecular weight component is obtained in the riser. The way to differentiate the gas composition in the riser and the downcomer is the "barrier" feed: according to the examples of WO2006/002778 the barrier stream only consists of propylene, which is fed to the larger upper part of the downcomer.

The patent Application WO2005/059210 discloses fibres for thermal bonding applications made of semicrystalline random copolymers of propylene with 1-hexene having a low degree of modification of the polymer. The amount of 1-hexene ranges from 1.5 to less than 3% by weight with respect to the total weight of the copolymer. Such fibers show a good balance of tenacity, elongation at break and bonding force. Also these propylene/1-hexene copolymers are produced by means of a polymerization apparatus comprising two interconnected polymerization zones, the riser and the downcomer. According to the examples of WO2005/059210 the polymer composition shows a narrow distribution of the molecular weights obtained without using a liquid barrier, so that the hydrogen concentration is kept at the same concentration in both riser and downcomer, while the hexene-1 comonomer is fed only into the downcomer.

As regards the modality to feed 1-hexene to the reactor, the only teaching of the above prior art patents is feeding a stream of 1-hexene in any feed point along the reactor (disclosure of WO06/002778), or similarly introducing a concentrated stream of pure 1-hexene into the downcomer (disclosure of WO05/059210). As a consequence, the 1-hexene comonomer is fed to the reactor not diluted in other components, such as for instance propylene or polymerization diluents.

It has been now investigated that the above modality to feed the heavier comonomer in a concentrated stream is not advisable, because the low volatility of C4-C8 olefins makes difficult to reach a quick evaporation of these compounds in correspondence of the feeding point: as a consequence, little amounts of 1-hexene in a liquid state may flow downward along the downcomer until their evaporation is completed. In proximity of such wet zones of liquid the formation of polymeric chains more enriched with 1-hexene is highly probable and this clearly adversely influences the homogeneity of the propylene/1-hexene copolymers obtained from the reactor. A decrease of the copolymer homogeneity, with reference to the 1-hexene incorporation, causes a worsening of the mechanical properties of the final manufactured articles. For instance, in case of pipes derived from said copolymers the creep resistance and the impact strength are considerably reduced.

Moreover, in the worst case the presence of wet zones with a high concentration of liquid $C_4$-$C_8$ olefin along the downcomer can lead to the formation of polymer lumps, which interferes with the regular plug flow of the polymer in the downcomer: eventually, the discharge from the downcomer can be also clogged by these polymer lumps.

In view of the above technical problems, when copolymerizing propylene with a heavier $C_4$-$C_8$ α-olefin in such a polymerization reactor, there is a need of suitably selecting the operative conditions in order to overcome the above mentioned technical drawbacks.

It is therefore an object of the present invention a process for the gas-phase copolymerization of:
(a) propylene,
(b) at least one $C_4$-$C_8$ α-olefin, and
(c) optionally ethylene, the process being carried out in a reactor having two interconnected polymerization zones, wherein the growing polymer particles flow through the first of said polymerization zones (riser) under fast fluidization conditions, leave said riser and enter the second of said polymerization zones (downcomer) through which they flow downward in a densified form, leave said downcomer and are reintroduced into said riser, thus establishing a circulation of polymer between the riser and the downcomer, the gas mixture present in the riser being at least partially prevented from entering the downcomer by introducing into the upper part of said downcomer a liquid barrier having a composition different from the gaseous mixture present in the riser and comprising at least one $C_4$-$C_8$ α-olefin in a total amount of from 0.1% to 35% by mol.

BRIEF DESCRIPTION OF THE DRAWINGS

FIG. 1 is a diagrammatic representation of a gas-phase polymerization apparatus having two interconnected polymerization zones, as described in EP-B-1012 195.

The process of present invention is addressed to improve the operability of a gas-phase reactor having interconnected polymerization zones of the type described in EP 1012195 when propylene is copolymerized with a heavier olefin, such as 1-hexene or 1-butene.

In the first polymerization zone (denominated riser) fast fluidization conditions are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid (mass of polymer per volume of reactor) are achieved, said density of solid approaching the bulk density of the polymer. Throughout the present description a "densified form" of the polymer implies that the ratio between the mass of polymer particles and the reactor volume is higher than 80% of the "poured bulk density" of the obtained polymer. The "poured bulk density" of a polymer is a parameter well known to the person skilled in the art. In view of the above, it is clear that in the downcomer the polymer flows downward in a plug flow and only small quantities of gas are entrained with the polymer particles.

According to the process of the present invention the two interconnected polymerization zones are operated in such a way that the gas mixture coming from the riser is totally or partially prevented from entering the downcomer by introducing into the upper part of the downcomer a liquid stream having a composition different from the gaseous mixture present in the riser. In order to comply with this process feature, one or more feeding lines for a liquid barrier are preferably placed close to the upper limit of the volume occupied by the densified solid in the downcomer.

This liquid mixture fed into the upper part of the downcomer partially replaces the gas mixture entrained with the polymer particles entering the downcomer. The partial evaporation of the liquid barrier generates in the upper part of the downcomer a flow of gas, which moves counter-currently to the flow of descendent polymer, thus acting as a barrier to the gas mixture coming from the riser and entrained among the polymer particles. The liquid barrier fed to the upper part of the downcomer can be sprinkled over the surface of the polymer particles: the evaporation of the liquid will provide the required upward flow of gas.

The feed of the liquid barrier causes a difference in the concentrations of monomers and hydrogen (molecular weight regulator) inside the riser and the downcomer, so as a bimodal polymer can be produced.

According to the process of the invention the liquid barrier fed to the upper part of the second polymerization zone (downcomer) comprises at least one $C_4$-$C_8$ α-olefin in an amount diluted with respect to the main monomer, which is propylene in the present invention. In particular, said liquid barrier comprises from 0.1% to 35% by mol of at least one $C_4$-$C_8$ α-olefin, which is diluted in the main monomer propylene.

It is known that in a gas-phase polymerization process the reaction mixture comprises, besides the gaseous monomers, also inert polymerization diluents and chain transfer agents, such as hydrogen, useful to regulate the molecular weight of the obtained polymeric chains. The polymerization diluents are preferably selected from $C_2$-$C_8$ alkanes, preferably propane, isobutane, isopentane and hexane. Propane is preferably used as the polymerization diluent in the gas-phase polymerization of the invention, so that liquid propane is unavoidably contained in the liquid barrier, which is fed to the upper part of the downcomer.

The $C_4$-$C_8$ α-olefins to be copolymerized with propylene are preferably selected from 1-butene and 1-hexene.

According to a first embodiment of the invention the $C_4$-$C_8$ α-olefin to be copolymerized with propylene is 1-hexene and its amount ranges from 0.1% to 10% by mol. Moreover, the liquid barrier further comprises:
  from 70 to 90% by mol of propylene;
  from 5 to 15% by mol of propane;
  from 0 to 5% by mol of ethylene.

In this case the obtained polyolefin contains from 0.1 to 8% by weight, preferably from 0.5 to 6% by weight, of recurring units derived from 1-hexene.

According to a second embodiment of the invention the $C_4$-$C_8$ α-olefin to be copolymerized with propylene is 1-butene and its amount ranges from 2% to 30% by mol. Moreover, the liquid barrier further comprises:
  from 50 to 90% by mol of propylene;
  from 5 to 15% by mol of propane;
  from 0 to 5% by mol of ethylene.

In this case the obtained polyolefin contains from 1 to 25% by weight, preferably from 5 to 15% by weight, of recurring units derived from 1-butene.

The above indicated compositions of liquid barrier can be obtained from the condensation of a part of the fresh monomers and propane, said condensed part being fed to the upper part of the downcomer in a liquid form. According to a preferred embodiment, the above suitable compositions of liquid barrier derive from condensation and/or distillation of a part of the gaseous stream continuously recycled to the reactor having two interconnected polymerization zones.

The recycle gas stream is generally withdrawn from a gas/solid separator placed downstream the riser, cooled by passage through an external heat exchanger and then recycled to the bottom of the riser. Of course, the recycle gas stream comprises, besides the gaseous monomers, also the inert polymerization components, such as propane, and chain transfer agents, such as hydrogen. Moreover, the composition of the liquid barrier deriving from condensation and/or distillation of the gas recycle stream may be suitably adjusted by feeding liquid make-up monomers and propane before its introduction into the upper part of downcomer.

The comparative examples of present Application demonstrates that when a liquid stream having a high concentration of a $C_4$-$C_8$ α-olefin, such as 1-hexene, is fed to the upper portion of the downcomer there is presence of wet zones with a high concentration of 1-hexene in the downcomer, which causes the formation of polymer lumps. Moreover, a lower homogeneity in the 1-hexene distribution in the copolymer is achieved. On the contrary, when feeding a liquid barrier comprising 1-hexene diluted in the main monomer propylene to the downcomer the above technical drawbacks are not observed.

In particular, in case of a propylene/1-hexene copolymer optimal operating conditions are satisfied when the composition of the liquid barrier comprises from 1% to 6% by mol of 1-hexene, from 80 to 90% by mol of propylene, from 5 to 15% by mol of propane.

In case of a propylene/1-butene copolymer optimal operating conditions are satisfied when the composition of the liquid barrier comprises from 20% to 30% by mol of 1-butene, from 55 to 75% by mol of propylene, from 5 to 15% by mol of propane.

The operating parameters of temperature and pressure are those that are usual in gas-phase catalytic polymerization processes. For example, in both riser and downcomer the temperature is generally comprised between 60° C. and 120° C., while the pressure can ranges from 5 to 40 bar.

The process of the present invention will now be described in detail with reference to the enclosed FIGURE, which has to be considered illustrative and not limitative of the scope of the invention.

FIG. 1 is a diagrammatic representation of a gas-phase polymerization apparatus having two interconnected polymerization zones, as described in EP-B-1012 195. By way of an example the polymerization reactor of FIG. 1 operates the gas-phase copolymerization of propylene with 1-hexene and ethylene. Hydrogen is used as the molecular weight regulator and propane is used as the polymerization diluent.

The polymerization reactor comprises a first polymerization zone 1 (riser), wherein the polymer particles flow upward under fast fluidization conditions along the direction of the arrow A and a second polymerization zone 2 (downcomer), wherein the polymer particles flow downward under the action of gravity along the direction of the arrow B. The riser 1 and the downcomer 2 are appropriately interconnected by the sections 3 and 4.

The catalyst components, preferably after a prepolymerization step, are continuously introduced via line 5 into the riser 1. The produced polyolefin is continuously discharged from the second polymerization zone via the discharge line 6, which is placed at the bottom part of the downcomer 2.

The growing polymer particles and the gaseous mixture leave the top of riser 1 and are conveyed to a solid/gas separation zone 7, from which the polymer particles are separated from part of the gaseous stream. The separated polymer flows down in the downcomer 2, while a gaseous mixture flows upward to the top of said separation zone 7 and enters the gas recycle line 8.

The recycle gas flowing along line 8 is subjected to compression by means of the recycle compressor 9 and successively a part of this recycle gas is conveyed via line 10 to the section 4 connecting the bottom of the downcomer 2 to the bottom of the riser 1. Said stream of recycled gas fosters the continuous transport of the polymer from the downcomer 2 to the riser 1.

A second stream of recycled gas is subjected to cooling by heat exchanger 11, and the cooled recycled gas is fed via line 12 to the bottom of the riser 1. Said stream of recycled gas ensures the continuous fast fluidization of the polymer particles along the riser 1. The make-up monomers, i.e. propylene, 1-hexene, ethylene, and hydrogen as the molecular weight regulator, are fed to the polymerization reactor via line 13, suitable placed on the recycle line 12, according to the knowledge of a person skilled in art.

A third stream of recycle gas coming from the compressor 9 is conveyed via line 14 to a first distillation column 15 provided with top condenser 16, which performs a first separation step between the lightest components and the heaviest components contained in the gas mixture. A gaseous stream rich in hydrogen and ethylene is withdrawn from the top of distillation column 15, and is recycled through compressor 17 to the liquid barrier Lb via line 18.

A liquid stream comprising mostly 1-hexene, propylene and propane is withdrawn from bottom of distillation column 15. Said liquid stream is pressurized by the pump 19 and is conveyed via line 20 to the upper portion of a second distillation column 21, provided with a reboiler 22 and a top condenser 23.

The composition of the liquid stream withdrawn from the bottom of distillation column 21 results enriched with 1-hexene, contains a little amount of ethylene and only few ppm (mol) of hydrogen. Said liquid stream is conveyed via line 24 to the upper portion of the downcomer 2. Before its introduction in the downcomer 2, the composition of this liquid stream may be suitably adjusted by feeding appropriate amounts of 1-hexene, propylene and ethylene via line 25 with the purpose to obtain the claimed composition of liquid barrier to be fed to the upper portion of the downcomer 2. According to a preferred embodiment of the invention, said liquid barrier Lb comprises from 0.1% to 10% by mol of 1-hexene.

The liquid barrier Lb may be introduced into the downcomer 2 by means of one or more feeding lines 26 placed along the upper portion of the downcomer 2. More feeding points can be arranged in correspondence of a same cross section of the downcomer in order to favor the uniform distribution of liquid inside the downcomer. Control valves are placed on all the feed lines 26, in order to adjust the flow rate Lb of liquid directly introduced in the upper part of downcomer 2.

The gaseous stream coming from the top of the second distillation column 21, which contains mostly propylene, propane and ethylene, is sent back via line 27 to the gas recycle line 8 at a feed point situated upstream the recycle compressor 9.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_n X_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:

at least a transition metal compound containing at least one π bond;

at least an alumoxane or a compound able to form an alkylmetallocene cation; and optionally an organo-aluminum compound.

A preferred class of metal compounds containing at least one π bond are metallocene compounds belonging to the following formula (I):

$$Cp(L)_qAMX_p \qquad (I)$$

wherein M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, SiPhMe, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

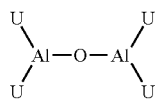

wherein the substituents U, same or different, are defined above.

In particular, alumoxanes of the formula:

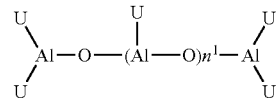

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

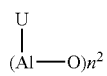

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above.

The pre-polymerization may be carried out by any suitable process, for example, polymerization in a liquid hydrocarbon diluent or in the gas phase using a batch process, a semi-continuous process or a continuous process.

The following examples will further illustrate the present invention without limiting its scope.

EXAMPLES

Characterization

Melt Flow Index, condition L (MIL): determined according to ISO 1133 (230° C./5 Kg).

1-hexene content; 1-butene content; ethylene content: determined by IR spectroscopy in copolymers; determined by $^{13}$C-NMR spectroscopy in terpolymers.

—Polydispersity Index (PI)—

This property is strictly connected with the molecular weight distribution of the polymer under examination. It is inversely proportional to the creep resistance of the polymer in molten state. Said resistance, called modulus separation at low modulus value, i.e. 500 Pa, was determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

—Melting Temperature—

Determined by differential scanning calorimetry (DSC): a sample of 6 mg of copolymer is heated to 220° C. at a rate of 20° C./min and kept at 220° C. for 2 minutes in nitrogen stream and it is thereafter cooled at a rate of 20° C./min to 40° C., thereby kept at this temperature for 2 min to crystallize the sample. Then, the sample is again fused at a temperature rise rate of 20° C./min up to 220° C. The melting scan is recorded, a thermogram is obtained, and, from this, temperatures corresponding to peaks are read. The highest peak of temperature is considered as the melting temperature.

—Xylene-Soluble Content—

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Example 1

Preparation of a Propylene/1-Hexene/Ethylene Terpolymer

The process of the invention is carried out under continuous conditions in a plant comprising a reactor having interconnected polymerization zones, as shown in FIG. 1.

A Ziegler-Natta catalyst is used as the polymerization catalyst comprising:
 a titanium solid catalyst component prepared with the procedure described in EP 728 769, Example 5, lines 46 to 53, according to which di-isobutyl phthalate is used as an internal donor compound;
 triethylaluminium (TEAL) as a cocatalyst;
 dicyclopentyldimethoxysilane as an external donor.

The above components are pre-contacted in a pre-activation vessel at a temperature of 15° C. for 10 minutes with a weight ratio TEAL/(solid catalyst component) of 5 and a weight ratio TEAL/(external donor) of 4.

The activated catalyst is fed to the gas-phase polymerization reactor, where propylene is polymerized with 1-hexene using $H_2$ as molecular weight regulator and propane as an inert polymerization diluent. The polymerization is carried out at a temperature of 80° C. and at a pressure of 26 bar.

The operative conditions are selected so as to prepare a low molecular weight (LMW) copolymer in the riser and a high molecular weight (HMW) copolymer in the downcomer. This bimodality is achieved by feeding a liquid barrier Lb to the upper part of the downcomer, so as to differentiate the hydrogen concentration in riser and in downcomer.

As shown in FIG. 1 and according to the teaching of present invention, part of the gas recycle stream is taken away upstream the compressor 9 and is conveyed via line 14 to a sequence of a first distillation column 15 and a second distillation column 21. A first separation step between the lightest components and the heaviest components contained in the gas mixture is performed in the first distillation column: a liquid stream comprising mostly 1-hexene, propylene and propane is withdrawn from bottom of first distillation column and is conveyed to the upper portion of the second distillation column. The liquid stream withdrawn from the bottom of second distillation column is conveyed to the upper portion of the downcomer and, before its introduction in the downcomer, the composition of this liquid stream is suitably adjusted by feeding via line 25 appropriate amounts of 1-hexene, propylene and ethylene. Control valves, placed on the feed lines 26, adjust the flow rate Lb of liquid barrier directly introduced in the upper part of the downcomer.

According to this polymerization run the liquid barrier Lb has the following molar composition: 1-hexene 4.0%; propylene 86.0%; ethylene 0.6%; propane 9.4%. The molar compositions of the reaction mixture inside the riser and the downcomer are given in Table 1. The produced propylene/1-hexene/ethylene terpolymer is continuously discharged from the bottom of the downcomer. A regular plug flow of the polymer along the height of the downcomer is obtained, without observing presence of liquid phase inside the downcomer. The homogeneity of the 1-hexene incorporation in the polymeric chains is estimated by measuring the melting temperature of a sample of the obtained polymer by means of differential scanning calorimetry (DSC). In fact, being equal the 1-hexene content, a lower melting temperature indicates a higher regularity in the 1-hexene distribution in the copolymer.

Table 2 shows the values of 1-hexene content, ethylene content, xylene-soluble content, melt index, polydispersity index and melting temperature Tm of the obtained terpolymer.

Example 2 (Comparative)

Preparation of a Propylene/1-Hexene/Ethylene Terpolymer

The same Ziegler-Natta catalyst system of Example 1 is used, pre-activated with the same modality indicated in Example 1.

The activated catalyst is fed to the gas-phase polymerization reactor, where propylene, 1-hexene and ethylene are polymerized using $H_2$, as the molecular weight regulator, and propane as an inert diluent. The polymerization is carried out at the same temperature and pressure of Example 1.

Part of the gas recycle stream is taken away upstream the compressor 9 and is conveyed via line 14 to the sequence of a first distillation column 15 and a second distillation column 21. The liquid stream withdrawn from the bottom of second distillation column is conveyed to the upper portion of the downcomer. Before the introduction in the downcomer the composition of this liquid stream is modified by feeding via line 25 a flow of fresh 1-hexene. According to this comparative polymerization run the liquid barrier Lb entering the downcomer via line 26 has the following molar composition: propylene 47.4%; 1-hexene 45.0%; ethylene 0.6%; propane 7.0% The molar compositions of the reaction mixture inside the riser and the downcomer are given in Table 1.

The regular plug flow of the polymer along the downcomer is observed to be disrupted by the formation of polymer lumps, probably caused by wet zones with a high concentration of 1-hexene flowing downward along the downcomer. The liquid phase in the downcomer is calculated to be of 8.3% by volume (expressed as a volume of liquid with respect to total volume of gas+liquid).

The produced propylene/1-hexene/ethylene terpolymer is discharged from the bottom of the downcomer. The homogeneity of the 1-hexene incorporation into the polymeric chains is estimated by measuring the melting temperature of a sample of the obtained copolymer.

Table 2 shows the values of 1-hexene content, ethylene content, xylene-soluble content, melt index MIL, polydispersity index and the melting temperature Tm of the obtained polymer. Notwithstanding the propylene/1-hexene/ethylene terpolymer obtained by this polymerization run has the same 1-hexene content of Example 1, the differential scanning calorimetry (DSC) gives a higher melting temperature (Tm=136° C.), which indicates a lower homogeneity in the 1-hexene distribution in the copolymer.

Example 3

Preparation of a Propylene/1-Hexene Copolymer

The same Ziegler-Natta catalyst system of Example 1 is used, pre-activated with the same modality indicated in Example 1.

The activated catalyst is fed to the gas-phase polymerization reactor, where propylene and 1-hexene are polymerized using $H_2$ as the molecular weight regulator and propane as an inert diluent. The polymerization was carried out at a temperature of 80° C. and at a pressure of 26 bar.

The operative conditions are selected so as to prepare a low molecular weight (LMW) copolymer in the riser and a high molecular weight (HMW) polymer in the downcomer. This bimodality is achieved by feeding a liquid barrier Lb to the upper part of the downcomer, so as to differentiate the hydrogen concentration in riser and in downcomer.

As shown in FIG. 1 and according to the teaching of present invention, part of the gas recycle stream is taken away upstream the compressor and is conveyed to the sequence of a first distillation column 15 and a second distillation column 21 to perform the separation between the lightest components and the heaviest components. The liquid stream withdrawn from the bottom of the second distillation column is conveyed to the upper portion of the downcomer and, before its introduction in the downcomer, the composition of this liquid stream is suitably adjusted by feeding appropriate amounts of 1-hexene and propylene.

According to this polymerization run the liquid barrier Lb has the following molar composition: 1-hexene 1.4%; propylene 88.6%; propane 10%. The molar compositions of the reaction mixture inside the riser and the downcomer are given in Table 1.

The produced propylene/1-hexene copolymer is continuously discharged from the bottom of the downcomer. A regular plug flow of the copolymer along the height of the downcomer is obtained, without observing presence of liquid phase inside the downcomer.

Table 2 shows the values of 1-hexene content, xylene-soluble content, melt index MIL, polydispersity index and melting temperature Tm of the obtained propylene/1-hexene copolymer.

Example 4 (Comparative)

Preparation of a Propylene/1-Hexene Copolymer

The same Ziegler-Natta catalyst system of Example 1 is used, pre-activated with the same modality indicated in Example 1.

The activated catalyst is fed to the gas-phase polymerization reactor, where propylene and 1-hexene are polymerized using $H_2$, as the molecular weight regulator, and propane as an inert diluent. The polymerization is carried out at the same temperature and pressure of Example 3. Part of the gas recycle stream is taken away upstream the compressor 9 and is conveyed via line 14 to the sequence of first distillation column 15 and second distillation column 21. The liquid stream withdrawn from the bottom of second distillation column is conveyed to the upper portion of the downcomer. Before the introduction in the downcomer the composition of this liquid stream is modified by feeding via line 25 a flow of fresh 1-hexene. According to this comparative polymerization run the liquid barrier Lb entering the downcomer via line 26 has the following molar composition: 1-hexene 45.0%; propylene 47.4%; propane 7.6% The molar compositions of the reaction mixture inside the riser and the downcomer are given in Table 1.

The regular plug flow of the polymer along the downcomer is observed to be disrupted by the formation of polymer lumps, probably caused by wet zones with a high concentration of 1-hexene flowing downward along the downcomer. The liquid phase in the downcomer is calculated to be of 5.3% by volume.

The produced propylene/1-hexene copolymer is continuously discharged from the bottom of the downcomer. The homogeneity of the 1-hexene incorporation into the polymeric chains is estimated by measuring the melting temperature of a sample of the obtained copolymer. Table 2 shows the values of 1-hexene content, ethylene content, xylene-soluble content, melt index MIL, polydispersity index and the melting temperature Tm of the obtained polymer.

Notwithstanding the propylene/1-hexene copolymer obtained by this polymerization run has the same 1-hexene content of Example 3, the differential scanning calorimetry (DSC) gives a higher melting temperature (Tm=153° C.), which indicates a lower homogeneity in the 1-hexene distribution in the copolymer.

TABLE 1

|  |  | Example 1 | Example 2 Compar. | Example 3 | Example 4 Compar. |
|---|---|---|---|---|---|
| Riser composition | T (° C.) | 80 | 80 | 80 | 80 |
|  | P (bar) | 26 | 26 | 26 | 26 |
|  | $H_2$ (% mol) | 0.4 | 0.15 | 0.25 | 0.15 |
|  | $C_6H_{12}$ (% mol) | 2.8 | 2.8 | 1 | 0.2 |
|  | $C_3H_6$ (% mol) | 87.7 | 87.7 | 88.7 | 89.5 |
|  | $C_3H_8$ (% mol) | 8 | 8 | 9.8 | 9.8 |
|  | $C_2H_4$ (% mol) | 1.1 | 1.1 | — | — |
| Downcomer composition | $H_2$ (% mol) | 150 ppm | 0.1 | 150 ppm | 0.1 |
|  | $C_6H_{12}$ (% mol) | 3.8 | 3.9 | 1.3 | 3.8 |
|  | $C_3H_6$ (% mol) | 86.2 | 85.8 | 88.1 | 86 |
|  | $C_3H_8$ (% mol) | 9.4 | 8.3 | 10 | 9.7 |
|  | $C_2H_4$ (% mol) | 0.6 | 1.3 | — | — |
|  | Liquid (% vol) | 0 | 8.3 | 0 | 5.3 |
| Liquid Barrier composition | $C_6H_{12}$ (% mol) | 4 | 45 | 1.4 | 45 |
|  | $C_3H_6$ (% mol) | 86 | 47.4 | 88.6 | 47.4 |
|  | $C_3H_8$ (% mol) | 9.4 | 7 | 10 | 7.6 |
|  | $C_2H_4$ (% mol) | 0.6 | 0.6 | — | — |

TABLE 2

| | Example 1 | Example 2 Compar. | Example 3 | Example 4 Compar. |
|---|---|---|---|---|
| MIL (g/10 min) | 1.1 | 1.1 | 1 | 1 |
| Polydispersity Index | 5 | 4.6 | 5 | 4.5 |
| 1-hexene content (wt %) | 2.6 | 2.6 | 1.3 | 1.3 |
| ethylene content (wt %) | 1.7 | 1.7 | — | — |
| xylene-soluble content (wt %) | 6.3 | 7.4 | 1.8 | 2.2 |
| Melting temperature (° C.) | 133 | 136 | 150 | 153 |

The invention claimed is:

1. A process comprising:
polymerizing
(a) propylene,
(b) at least one $C_4$-$C_8$ α-olefin, and
(c) optionally ethylene, wherein the polymerizing step is carried out in the gas-phase,
wherein the process is carried out in a reactor having two interconnected polymerization zones, a riser and a downcomer,
wherein polymer particles flow through the riser under fast fluidization conditions, leave said riser and enter the downcomer,
wherein the polymer particles in the downcomer flow downward in a densified form, leave said downcomer and are reintroduced into said riser, thus establishing a circulation of polymer between the riser and the downcomer,
wherein a gas mixture present in the riser is prevented from entering the downcomer by introducing a liquid barrier into an upper part of said downcomer, thereby creating a recycle gas mixture that flows upward to a separation zone wherein the liquid barrier comprises at least one $C_4$-$C_8$ α-olefin in a total amount of from 0.1% to 35% by mol, and has a composition different from the gas mixture present in the riser,
wherein the recycle gas is separated into:
(i) a first stream of recycled gas, wherein the first stream of recycled gas is fed into a bottom part of the downcomer,
(ii) a second stream of recycled gas, wherein the second stream of recycled gas is fed into a bottom part of the riser; and
(iii) a third stream of recycled gas, wherein the third stream of recycled gas is fed into at least one distillation column before being recycled into the downcomer.

2. The process according to claim 1, wherein the partial evaporation of said liquid barrier generates in the upper part of the downcomer a flow of gas moving counter-currently to the flow of descendent polymer.

3. The process according to claim 1, wherein the $C_4$-$C_8$ α-olefin is 1-hexene and its amount ranges from 0.1% to 10% by mol.

4. The process according to claim 3, wherein the liquid barrier further comprises:
from 70 to 90% by mol of propylene;
from 5 to 15% by mol of propane; and
from 0 to 5% by mol of ethylene.

5. The process according to claim 4, wherein the obtained polyolefin contains from 0.2 to 8.0% by weight of recurring units derived from 1-hexene.

6. The process according to claim 1, wherein the $C_4$-$C_8$ α-olefin is 1-butene and its amount ranges from 2% to 30% by mol.

7. The process according to claim 6, wherein the liquid barrier further comprises:
from 50 to 90% by mol of propylene;
from 5 to 15% by mol of propane; and
from 0 to 5% by mol of ethylene.

8. The process according to claim 7, wherein the obtained polyolefin contains from 1 to 25% by weight of recurring units derived from 1-butene.

9. The process according to claim 1, wherein the liquid barrier derives from condensation and/or distillation of a part of the gaseous stream continuously recycled to said reactor having two interconnected polymerization zones.

10. The process according to claim 9, wherein the composition of the liquid barrier is adjusted by feeding liquid make-up monomers and propane before introducing said liquid barrier into the upper part of the downcomer.

* * * * *